Sept. 17, 1946.  J. T. BUTTERFIELD ET AL  2,407,650
WIPER CONTACT FOR ELECTRICAL DEVICES
Filed Oct. 21, 1943   2 Sheets-Sheet 1
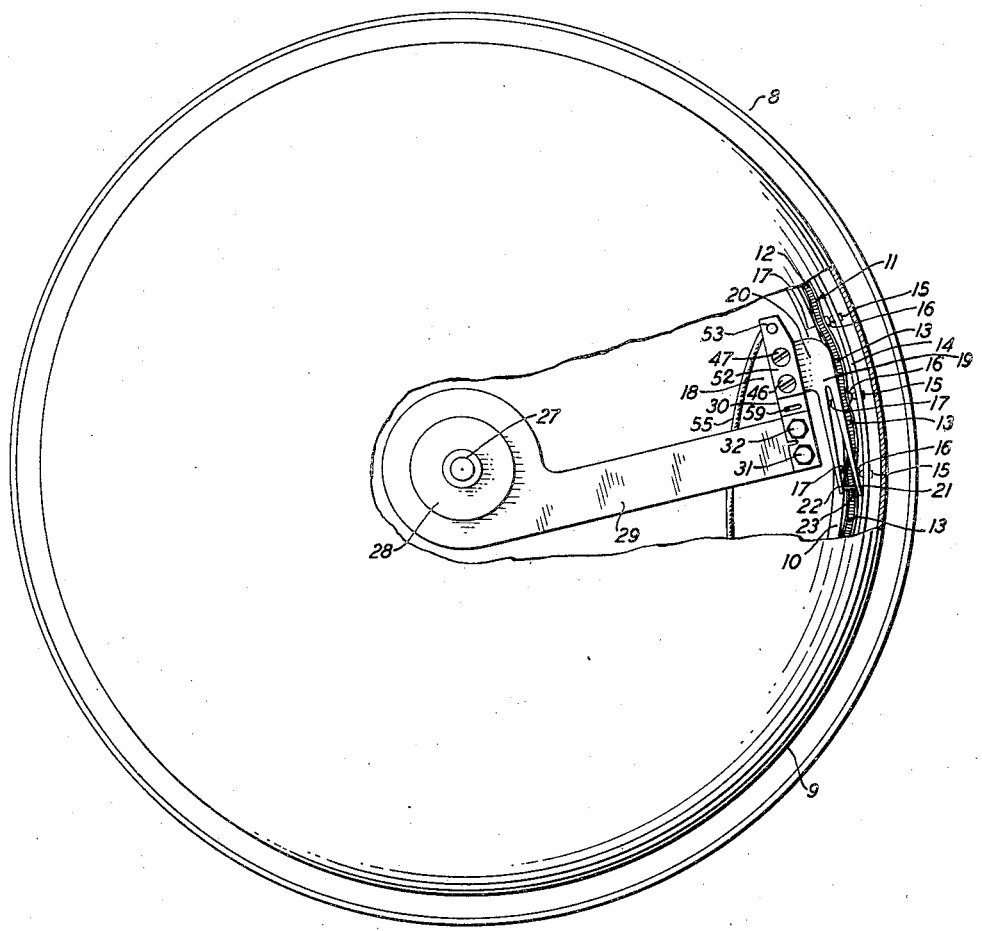
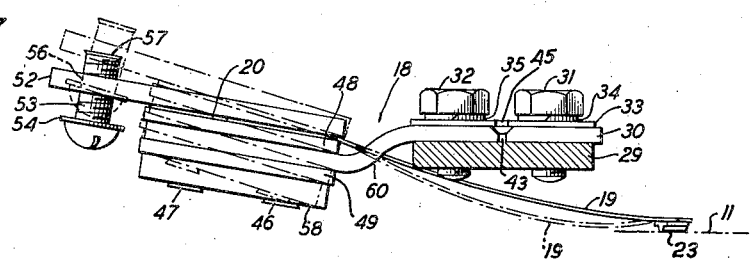
INVENTORS  J. T. BUTTERFIELD
H. M. KNAPP
B. F. RUNYON
BY J. MacDonald
ATTORNEY Sept. 17, 1946.  J. T. BUTTERFIELD ET AL  2,407,650
WIPER CONTACT FOR ELECTRICAL DEVICES
Filed Oct. 21, 1943  2 Sheets-Sheet 2
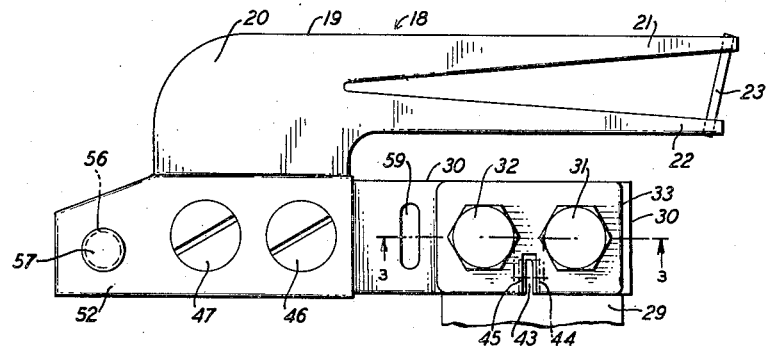
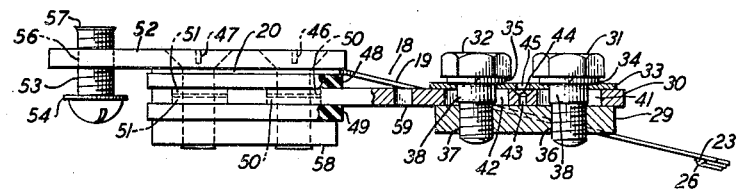
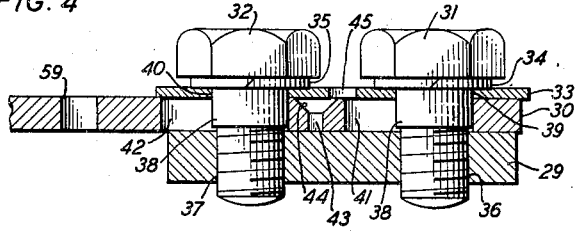
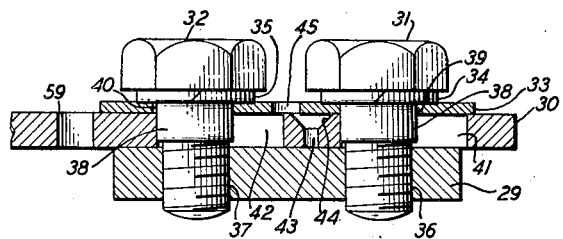
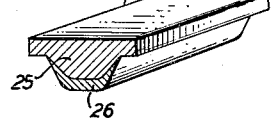
INVENTORS
J. T. BUTTERFIELD
H. M. KNAPP
B. F. RUNYON
BY J. MacDonald
ATTORNEY Patented Sept. 17, 1946

2,407,650

UNITED STATES PATENT OFFICE 2,407,650

WIPER CONTACT FOR ELECTRICAL DEVICES

Joseph T. Butterfield, Summit, N. J., Harry M. Knapp, Flushing, N. Y., and Benjamin F. Runyon, Basking Ridge, N. J., assignors to Bell Telephone Laboratories, Incorporated, New York, N. Y., a corporation of New York Application October 21, 1943, Serial No. 507,140

3 Claims. (Cl. 201—56)

This invention relates to wiper contacts and more particularly to wiper contacts suitable for use in rheostats or potentiometers.

The object of the invention is to provide in a rheostat or potentiometer, having a plurality of turns of wire on a support, a wiper contact that will successively engage the turns of wire without skipping any of the traversed turns when the contact making parts of the rheostat or potentiometer are relatively moved.

A feature of the invention resides in the conducting means provided in the wiper contact.

Another feature resides in means provided for supporting the conducting means of the wiper contact.

In the drawings:

Fig. 1 is an under-surface plan view of a potentiometer in which the invention is used and with part of a casing broken away to obtain a view of the wiper contact and its supporting means;

Fig. 2 is an enlarged view of the wiper contact and its supporting means;

Fig. 3 is a side view, partly in section, of the wiper contact and its supporting means and taken on the line 3—3 in Fig. 2;

Fig. 4 is an enlarged view, partly in section, of parts of the wiper contact and means provided for supporting the wiper contact;

Fig. 5 corresponds to Fig. 4 but shows one of the parts adjusted to a different position;

Fig. 6 is an enlarged view, in perspective and partly in section, of a contact element; and Fig. 7 is a side view, partly in section, of the wiper contact and its supporting means and shows in full and dot-dash lines parts of the invention adjusted to different positions.

In some potentiometers now required and involving a winding of resistance wire on a card-like support and a wiper contact to selectively engage the turns of wire, it is found quite important to insure that the wiper contact will not skip or bounce over some of the turns of wire and a precise predetermined pressure will be maintained by the wiper contact against the turns of resistance wire it engages. In some of the potentiometers, above mentioned, the resistance element involving the wire-wound card is clamped at predetermined spaced points to a drum-type support in order that certain predetermined electrical potentials will be obtained when the potentiometer is operated in an electrical system and the wiper contact engages the resistance element at points in direct radial line with the points of clamping. When the resistance element is clamped in place at the required spaced points, parts of the resistance element between the points of clamping are often more or less bulged away from the drum-type support, and the edge of the resistance element presented for engagement by the wiper contact is in wave-like form. In such cases, if the contact end of the wiper contact were of pin-point form the wiper contact might run off the resistance element at the bulged points during its traverse of the resistance element. The edge of the resistance element presented for engagement by the wiper contact may also in some cases have some of its parts in slightly higher or lower planes than other parts due to slight inaccuracies in clamping the resistance element in place with respect to a desired line of travel of the wiper contact or slight differences in the distance the various turns of wire extend beyond an edge of the supporting card.

In the present invention we provide a wiper contact which will faithfully perform its function of successively engaging the turns of wire on the resistance element. The wiper contact will not run off the resistance element during its traverse thereof and will not skip or bounce over any of the turns of wire the wiper contact is required to engage during its operation along the resistance element.

For the purpose of simplification in explaining the invention, and not in the sense of limiting it in application, the device in which it is used will be considered to be and hereinafter referred to as a potentiometer.

As shown in Fig. 1 the potentiometer 8 comprises a casing 9 in which is suitably supported an annular support 10 around the outer curved surface of which is supported a resistance element 11 comprising a card-like support 12 on which is wound a resistance wire, the turns of which extending over one edge of the card-like support 12 are indicated at 13 in Fig. 1. Concentric with the support 10 and the resistance element 11 is a hoop 14 in which screws 15 are supported at spaced points, the hoop 14 being drilled and tapped to receive the screws 15 and the inner ends of the screws 15 having bearing engagement with blocks 16 so that when the screws 15 are tightened the blocks 16 will clamp the resistance element 11 to the support 10 at required spaced points, the spaced points being predetermined and indicated by the marks 17 on the support 10. It will be seen that between points in line with the marks 17 where the resistance element 11 is clamped the resistance element is somewhat bulged away from the support 10 and that if a wiper contact having only a pinpoint contact piece thereon where swept in a true circular line of travel over the underlying edge of the resistance element 11, the contact piece would at times run off the resistance element.

In potentiometers in which the present invention is found of particular value the card-like support 12 is made in some cases of hard rubber or insulating fiber and the resistance wire is wound in a plurality of equally spaced turns on the card-like support 12 and so that turns of the wire cross the long edge portions of the card-like support 12. In winding the resistance wire on the card-like support 12 the wire is kept under such tension that the wire is partly embedded in the edge portion of the card-like support 12. It has been found that due to some slight differences in manufacture of the sheet material from which the card-like support 12 is made and due to some slight differences in the tension of the wire while it is being wound on the card some turns of the wire sink more deeply than others in the edge of the card-like support 12 and that all turns of the wire on an edge of the card-like support 12 are not in exactly the same plane. It is obvious that under such conditions a rigid wiper contact could not be used without the danger of having the wiper contact miss some of the turns of wire when the wiper contact is frictionally swept over the edge of the resistance element 11.

In the present invention the wiper contact 18 is constructed so that it will engage each turn of the resistance wire in succession when the wiper contact 18 is moved along the edge of the resistance element 11. The wiper contact 18 as shown clearly in Figs. 1 and 2 comprises a reed-like sheet metal fork 19 having a body 20 and two tines 21 and 22. The fork 19 is made and supported so that spring tension may be developed in the tines and the material employed should have good electrical conducting qualities. We have found a copper-silicon alloy is a good material for the purpose. Bridged across and welded or otherwise secured to the free ends of the tines 21 and 22 is a contact piece 23 which is of considerably greater length than the thickness of the resistance element 11, the length being determined by the thickness of the resistance element 11 plus the greatest distance the resistance element 11 bulges at any point away from the support 10. The contact piece 23 is made of good electrical conducting material and may be made in the form shown in Fig. 6 which in this case comprises a rectangular body 24 having a longitudinal ridge 25 which is coated on its outer surface with a covering 26 of contact metal. We have found that nickel is a good material for the body 24 and a platinum-ruthenium alloy is a good material for the coating 26.

The potentiometer 8 shown in Fig. 1 is provided with a rotatable shaft 27 upon which is mounted by means of a flange 28 an arm 29. On the free end of the arm 29 the wiper contact 18 is supported by means of a bracket 30 which extends angularly of the free end of the arm 29. One end of the bracket 30 is clamped to the free end of the arm 29 by means of screws 31 and 32, a plate 33 and lock washers 34 and 35. Tapped holes 36 and 37 as shown in Figs. 3, 4 and 5 are provided in the free end of the arm 29 to receive the threaded ends of the screws 31 and 32, respectively, which are tightly secured to the arm 29. The shank of each screw 31 and 32 is enlarged above the threaded end as shown at 38 and the plate 33 is apertured at 39 and 40 to snugly receive the enlarged portion 38 of the screws 31 and 32. Apertures 41 and 42 of considerably larger diameter than the enlarged portions 38 of the screws 31 and 32 are provided in one end portion of the bracket 30 to accommodate the enlarged portion 38 of the screws 31 and 32 and a slot 43 is provided in the bracket 30, the slot 43 extending inwardly from one edge of the bracket 30 to a point between the apertures 41 and 42. The top of the slot 43 is enlarged and beveled to provide downwardly and inwardly sloping surfaces at 44 for a purpose to be subsequently explained. The plate 33 is provided with an elongated opening at 45 which extends inwardly from an edge of the plate 33 and to a point substantially midway between the apertures 39 and 40. When the screws 31 and 32 are tightened one end portion of the bracket 30 is clamped by means of the plate 33, the washers 34 and 35 and the screws 31 and 32 to the free end portion of the arm 29 and so that the bracket 30 extends angularly of the arm 29.

The body portion 20 of the sheet metal fork 19 is mounted on the free end portion of the bracket 30 by means of screws 46 and 47 and is insulated from the bracket 30 by means of insulating plates 48 and 49 as shown in Fig. 3. The insulating plates 48 and 49 are identical in form, each plate being apertured to accommodate the screws 46 and 47 and having annular bosses 50 and 51 which fit into corresponding apertures provided in the free end portion of the bracket 30. It will be seen that the insulating plates 48 and 49 are disposed on opposite faces of the bracket 30, the body portion 20 of the sheet metal fork 19 rests on the upper surface of the insulating plate 48 and the bosses 50 and 51 of the two insulating plates extend into apertures in the bracket 30 and cooperate to form insulating bushings around the screws 46 and 47 where the screws extend through the bracket 30. Resting on the upper surface of the body portion 20 of the sheet metal fork 19 and held in place by means of the screws 46 and 47 is a conducting plate 52 which is apertured and countersunk to receive the head portions of the screws. The conducting plate 52 is provided with a screw 53 and a washer 54 which may be used as a binding post to electrically connect a lead wire 55 to the conducting plate 52 as shown in Fig. 1. The screw 53 extends through a tapped hole 56 in the plate 52 and is upset on its threaded end as shown at 57 to prevent accidental separation of the screw 53 from the plate 52. The lower ends of the screws 46 and 47 extend through a drilled and tapped metal plate 58 disposed against the lower surface of the insulating plate 49 and the lower ends of the screws 46 and 47 are upset against the lower surface of the plate 58 to prevent accidental loosening of the screws 46 and 47.

The bracket 30 forms, in effect, a substantially rigid connecting bar between the free end of the arm 29 and the body portion 20 of the sheet metal fork 19 but should be made of such material that it may be bent to a required form by means of a suitable hand tool, the bend being made between the point at which the bracket 30 is supported on the arm 29 and the pile-up of parts comprising the free end portion of the bracket 30 and the insulating plates 48 and 49. To facilitate bending the bracket 30 at the required point an elongated aperture 59 is formed in the bracket 30, the aperture 59 extending part way across the bracket 30 and in parallel relation with a side of the free end of the arm 29. A convenient way of bending the bracket 30 is to insert a screwdriver in the aperture 59 and use the screwdriver as a lever to bend the bracket 30 to a required form; one of the forms of the bracket 30 may be made to take that shown in Fig. 7 in which the bracket 30 has been bent to provide an off-set form as indicated at 60.

It will be seen as shown in Fig. 1 that the arm 29 extends from the shaft 27 in the central portion of the potentiometer 8 and toward the location of the resistance element 11, the bracket 30 extends angularly of the free end portion of the arm 29 and the tines 21 and 22 of the sheet metal fork 19 extend in spaced relation with the bracket 30 and so that the contact piece 23 crosses and is in engagement with the resistance element 11. By turning the shaft 27 the contact piece 23 may be caused to sweep over and frictionally engage the turns of resistance wire extending over the edge of the card-like support 12.

In potentiometers in which the present invention is found of particular value, the potentiometers are sometimes operated at a substantially constant and relatively high speed, the turns of wire on the resistance element 11 are wound on the card-like support at a constant pitch and the wiper contact must therefore traverse a predetermined number of turns of the resistance wire on the engaged edge portion of the resistance element and arrive on a predetermined turn of the resistance wire at the end of a predetermined period of time. The potentiometer must be so constructed and arranged that certain predetermined voltages will be obtained when the wiper contact reaches points in line with the marks 17 on the support 10 and in line with which are clamped predetermined points of the resistance element 11. To insure that the contact piece 23 of the wiper contact 18 will engage a predetermined turn of the resistance wire on the resistance element 11 when in line with a predetermined mark 17 and will not skip or bounce over the turn of resistance wire at that point, the sheet metal fork 19 is made to have a natural frequency of vibration such that the contact piece will engage the required turns of resistance wire. Theoretically, and as an example, in the case when the pitch of winding the wire on the card-like support is 160 turns per inch and the maximum speed of movement of the wiper contact is 6 inches per second, the natural frequency of the wiper contact is made so that its tracking frequency of vibration is a minimum of 960 cycles per second. In this case and assuming that there are 160 turns of wire per inch of travel of the wiper contact, the contact piece on the wiper contact will engage each turn of wire in succession and will arrive on a predetermined turn of wire at the end of the predetermined period of time. In this example it is also assumed that the turns of wire traversed are in a common plane. In cases where the number of turns of wire per inch of travel of the wiper contact and the maximum speed of travel of the wiper contact are greater than the above example, the wiper contact would be made to have a natural frequency of vibration greater than the frequency above mentioned.

In order to obtain a required pressure of the contact piece of the wiper contact against the turns of resistance wire and to obtain a sufficient amplitude of vibration to make the wiper contact reach a turn of wire located in a slightly lower plane than an adjacent turn the sheet metal fork 19 of the wiper contact 18 is so mounted relative to the resistance element that an initial spring pressure is developed in the sheet metal fork 19. As shown in Fig. 3 the sheet metal fork 19 extends diagonally from its point of support on the insulating plate 48 to a point considerably below the level of the arm 29. When the arm 29 is mounted in the potentiometer 8 shown in Fig. 1, the arm 29 is in a plane only slightly above the plane of the edge of the resistance element 11, the contact piece 23 is resting on the edge of the resistance element 11 and the tines 21 and 22 of the wiper contact are flexed so that a required initial spring pressure is developed in the tines. In some of the potentiometers, for instance, we have stressed the tines 21 and 22 so that the contact piece 23 bears against the resistance element 11 with a pressure of the order of 65 grams. The pressure may be increased or reduced as desired simply by bending the free portion of the bracket 30 as shown in Fig. 7 in which two of the many possible forms to which the bracket 30 may be shaped are shown. In the full-line position shown in this figure the bracket 30 has been bent so that the sheet metal fork 19 is slightly bowed to obtain a certain desired spring pressure and in the dot-dash line position the bracket 30 has been further bent so that the sheet metal fork 19 is bowed still more to obtain a greater spring pressure. The bracket 30 may be bent to the forms shown simply by placing the blade of a screwdriver in the elongated aperture 59 and using the screw-driver as a lever to bend the bracket. By increasing or decreasing the spring tension of the sheet metal fork 19 the amplitude of vibration of the wiper contact may be changed to meet a required condition and if the amplitude of vibration is found not sufficient to make the contact piece 23 come into engagement with certain turns of the resistance wire extending in a slightly lower plane than other turns the spring pressure may be increased to make the wiper contact have a sufficient overthrow in its movement to reach the lower turns of resistance wire.

The particular structure and arrangement shown for mounting the bracket 30 on the arm 29 permit adjustment of the bracket 30 in regard to its extension from the arm 29. As already pointed out in the specification, the screws 31 and 32 are securely mounted on the arm 29 and the plate 33 is secured against movement since the holes therein for the screws 31 and 32 snugly accommodate the screws. The holes 41 and 42 in the bracket 30 are considerably larger in diameter than the enlarged portion 38 of the screws 31 and 32 and by loosening the screws 31 and 32 the bracket 30 may be released for movement on the arm 29 within limits permitted by the enlarged portions 38 of the screws 31 and 32 and the relatively large apertures 41 and 42 in the bracket 30. The angle of extension of the bracket 30 relative to the arm 29 may be changed by loosening the screws 31 and 32 and by manually turning the bracket 30 on its point of support on the arm 29 and within the limits permitted by the screws 31 and 32 and the apertures 41 and 42. By turning the bracket 30 in this manner the angle of extension of the contact piece 23 relative to the direction the resistance wire in the resistance element 11 extends over an edge of the card-like support 12 may be changed. The wiper contact 18 may, therefore, be adjusted so that the contact piece 23 extends either angularly or in parallel relation with turns of the resistance wire on an edge of the card-like support 12.

The bracket 30 may be also adjusted longitudinally to extend a shorter or longer distance from the arm 29 so that when the arm 29 is in a given position and the contact piece 23 is found to be either forward or backward of a predetermined turn of resistance wire it is desired to select for the given position of the arm 29, the bracket 30 may be, in effect, shortened or lengthened to bring the contact piece 23 to the desired turn of resistance wire.

The pitch of winding the resistance wire on the card-like support 12 is usually so short that it would be difficult to adjust the wiper contact 18 to engage a desired turn of the wire simply by shifting the bracket 30 longitudinally by hand. In order that very precise longitudinal adjustment of the bracket 30 may be made, the slots 43 and 45 are provided in the bracket 30 and the plate 33, respectively, the slot 43 being enlarged and beveled at 44. For a normal setting of the bracket 30 the slots 43 and 45 will be in registry as shown in Fig. 3. To move the bracket 30 longitudinally from the position shown in Fig. 3, and after the screws 31 and 32 are loosened, the blade of a screw-driver may be inserted in the slots 45 and 43 and the screw-driver operated as a lever to move the bracket 30, the wall of the slot 45 being used as a fulcrum point in the operation of the screw-driver.

In Fig. 4 the bracket 30 has been moved longitudinally to the left from the position shown in Fig. 3 to make the bracket 30 extend a greater distance from the arm 29. To move the bracket 30 slightly back from this position very precise movement may be accomplished by simply placing the screw-driver blade in the slot 45 and driving the blade end down against one side of the beveled portion 44. In Fig. 5 the bracket 30 has been moved longitudinally to the right of the positions shown in Figs. 3 and 4 and presumably by means of a screw-driver. This movement is, in effect, the same as shortening the bracket 30. After the required longitudinal adjustment of the bracket 30 has been made to bring the contact piece 23 to a required position on a predetermined turn of the resistance wire on the card-like support 12, the screws 31 and 32 are tightened to press the plate 33 against the bracket 30 and thus clamp the bracket 30 in the required position on the arm 29.

It will be seen from the foregoing description and the drawings that we have provided a wiper contact suitable for use in a precision potentiometer, the wiper contact may be made to have a predetermined natural frequency of vibration to meet certain requirements, the wiper contact will not skip or bounce over turns of a wire-wound resistance element when the potentiometer is operated, and the structure and arrangement of the parts permit increasing or decreasing the contact pressure, adjustment of the amplitude of vibration of the wiper contact and adjustment of the position of a contact piece embodied in the wiper contact to required positions relative to turns of wire on the resistance element.

What is claimed is:

1. A wiper contact to frictionally traverse an electrical element, said wiper contact comprising an arm, a bendable bracket supported at one end on said arm, a reed-type conducting member secured at one end on the unsecured end of said bracket and having an unsecured end portion extending into contact with the electrical element, and said bracket having an aperture formed therein between the secured end of said bracket and said conducting member to provide a hold for means to be applied to said bracket to bend said bracket to change the pressure of said reed-type conducting member on the electrical element.

2. A wiper contact comprising an arm, an apertured bracket supported at one end on said arm and extending angularly of said arm, spaced screws mounted on said arm and extending through the apertures in said bracket, the apertures in said bracket being larger than the diameter of said screws, an apertured plate disposed between the heads of said screws and said bracket, the apertures in said plate being of substantially the same diameter as said screws, said plate and said screws cooperating to clamp said bracket to said arm, a reed-type contact supported at one end on the free end of said bracket, and said bracket and said plate, each, having a slot formed therein and into which the blade of a screw-driver may be inserted to longitudinally move said bracket when said screws are loosened.

3. In a variable electrical resistance device, in which the resistance element is a resistance wire wound in a plurality of turns, a wiper contact, means to cause relative movement of said resistance element and said wiper contact, said wiper contact being operable to selectively engage the turns of said resistance wire and comprising, in combination, an arm having a free end extending in the vicinity of said resistance element, screws mounted in spaced relation on the free end of said arm, a bracket mounted at one end on and extending angularly of the free end of said arm, said bracket having apertures formed therein to receive said screws and of larger diameter than said screws, a plate apertured to accommodate said screws and cooperating with said screws to clamp said bracket to said arm, a slot formed in said plate, a second slot formed in said bracket, said slots being normally in registry with each other and providing apertures through which a tool may be inserted to longitudinally move said bracket to change the distance said bracket extends from said arm, a fork of conducting material having its closed end mounted on said bracket, means to mount said fork on said bracket, tines on said fork extending backwardly along and in spaced relation with said bracket and a bar of contact material bridged across and secured to said tines and arranged to frictionally engage the turns of resistance wire on said resistance element.

JOSEPH T. BUTTERFIELD.
HARRY M. KNAPP.
BENJAMIN F. RUNYON.